United States Patent
Das et al.

(10) Patent No.: US 9,148,764 B2
(45) Date of Patent: **\*Sep. 29, 2015**

(54) CHARACTERIZING AN INDOOR STRUCTURE BASED ON DETECTED MOVEMENTS AND/OR POSITION LOCATIONS OF A MOBILE DEVICE

(71) Applicant: QUALCOMM Incorporated, San Diego, CA (US)

(72) Inventors: Saumitra Mohan Das, San Jose, CA (US); Behrooz Khorashadi, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,615

(22) Filed: Nov. 20, 2013

(65) Prior Publication Data

US 2014/0080514 A1    Mar. 20, 2014

Related U.S. Application Data

(63) Continuation of application No. 13/297,733, filed on Nov. 16, 2011, now Pat. No. 8,626,198.

(51) Int. Cl.

| H04W 24/00 | (2009.01) |
| H04W 4/04 | (2009.01) |
| G01S 5/02 | (2010.01) |
| H04W 4/02 | (2009.01) |

(Continued)

(52) U.S. Cl.
CPC ............... *H04W 4/04* (2013.01); *G01C 21/206* (2013.01); *G01S 5/0252* (2013.01); *H04W 4/028* (2013.01); *G01S 5/0036* (2013.01)

(58) Field of Classification Search
CPC ... H04W 64/00; H04W 4/22; H04W 56/0075; H04W 68/04; H04W 8/18; H04W 48/18; H04W 4/02; H04W 88/022; H04W 88/16; H04W 92/14; G01S 5/0027
USPC ................................... 455/436, 456.1–456.3
See application file for complete search history.

(56) References Cited

U.S. PATENT DOCUMENTS

| 7,848,881 B2 | 12/2010 | Tan et al. |
| 8,320,939 B1 | 11/2012 | Vincent |
| 8,626,198 B2 | 1/2014 | Das et al. |

(Continued)

OTHER PUBLICATIONS

International Search Report and Written Opinion—PCT/US2012/063954—ISA/EPO—Mar. 25, 2013.

*Primary Examiner* — Marcos Batista
(74) *Attorney, Agent, or Firm* — Berkeley Law & Technology Group LLP

(57) ABSTRACT

Various methods, apparatuses and articles of manufacture are provided which may be implemented in various devices for use in characterizing environments. In an example, a mobile device may, gather a plurality of measurements during a period of time, including one or more first measurements generated by one or more environmental sensors, and one or more second measurement generated by a radio based, at least in part, on one or more wireless signals received by the radio. In response to a determination that the mobile device is to report a travel history corresponding to at least a portion of the period of time, the mobile device may generate a travel log based, at least in part, on at least one first measurement and at least one second measurement, and transmit the travel log to an external device.

20 Claims, 7 Drawing Sheets

(51) Int. Cl.
   *G01C 21/20*   (2006.01)
   *G01S 5/00*    (2006.01)

(56) References Cited

U.S. PATENT DOCUMENTS

| | | | |
|---|---|---|---|
| 2007/0021126 A1* | 1/2007 | Nanda et al. | 455/456.1 |
| 2007/0224977 A1 | 9/2007 | Yamaguchi et al. | |
| 2010/0008337 A1 | 1/2010 | Bajko | |
| 2010/0125409 A1 | 5/2010 | Prehofer | |
| 2010/0178934 A1 | 7/2010 | Moeglein et al. | |
| 2010/0255856 A1 | 10/2010 | Kansal et al. | |
| 2011/0081918 A1 | 4/2011 | Burdo et al. | |
| 2011/0172906 A1 | 7/2011 | Das et al. | |
| 2012/0021762 A1* | 1/2012 | Garin et al. | 455/456.1 |
| 2012/0190379 A1* | 7/2012 | Hassan et al. | 455/456.1 |
| 2013/0244693 A1 | 9/2013 | Das et al. | |

* cited by examiner

CHARACTERIZING AN INDOOR STRUCTURE BASED ON DETECTED MOVEMENTS AND/OR POSITION LOCATIONS OF A MOBILE DEVICE

This patent application is a Continuation of U.S. patent application Ser. No. 13/297,733, filed Nov. 16, 2011, Titled, "CHARACTERIZING AN INDOOR STRUCTURE BASED ON DETECTED MOVEMENTS AND/OR POSITION LOCATIONS OF A MOBILE DEVICE", and which is assigned to the assignee hereof and incorporated herein by reference.

BACKGROUND

1. Field

The subject matter disclosed herein relates to electronic devices, and more particularly to methods, apparatuses and articles of manufacture for use in characterizing an area of location uncertainty within an indoor structure based on detected movements and/or position locations of a mobile device.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile devices, and particularly in outdoor environments. However, since some satellite signals may not be reliably received and/or acquired by a mobile device within an indoor environment, different techniques may be employed to enable position location services.

For example, mobile devices may attempt to obtain a position fix by measuring ranges to three or more terrestrial transmitters (e.g., wireless access point devices, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip time delay, etc.

These and other like position location and navigation techniques tend to be of further benefit to a user if presented with certain mapped features. For example, mapped features may relate to or otherwise identify certain physical objects, characteristics, or points of interest within a building or complex, etc. Thus, in certain instances, an indoor navigation system may provide a digital electronic map to a mobile device upon entering a particular indoor area, e.g., in response to a request for position assistance data. Such a map may show indoor features such as doors, hallways, entry ways, walls, etc., points of interest such as bathrooms, pay phones, room names, stores, etc. Such a digital electronic map may be stored at a server to be accessible by a mobile device through selection of a URL, for example. By obtaining and displaying such a map, a mobile device may overlay a current location of the mobile device (and user) over the displayed map to provide the user with additional context.

In certain instances, some of the information that may be provided to and/or otherwise used by a mobile device for navigational or other like purposes may change from time to time, or may even be unknown. Thus, it may be useful to determine whether such information may have changed, or to otherwise gather and/or develop such information in an efficient manner.

SUMMARY

In accordance with an example aspect, a method at a mobile device may comprise: gathering a plurality of measurements during a period of time, the plurality of measurements comprising at least a first measurement generated by one or more environmental sensors, and a second measurement generated by a radio based, at least in part, on one or more wireless signals received by the radio; and in response to a determination that the mobile device is to report a travel history corresponding to at least a portion of the period of time: generating a travel log for at least the portion of the period of time based, at least in part, on at least the first measurement and the second measurement; and transmitting one or more signals representing the travel log to an external device In accordance with an example aspect, a mobile device may comprise: memory; a network interface comprising a radio; an environmental sensor; and a processing unit to: gather in the memory a plurality of measurements during a period of time, the plurality of measurements comprising at least a first measurement generated by the environmental sensor, and a second measurement generated by the radio based, at least in part, on one or more wireless signals received by the radio; and in response to a determination that the mobile device is to report a travel history corresponding to at least a portion of the period of time: generate a travel log for at least the portion of the period of time based, at least in part, on at least the first measurement and the second measurement; and initiate transmission of the travel log to an external device.

In accordance with an example aspect, an apparatus may be provided for use in a mobile device, which comprises: means for gathering a plurality of measurements during a period of time, the plurality of measurements comprising at least a first measurement generated by one or more environmental sensors, and a second measurement generated by a radio based, at least in part, on one or more wireless signals received by the radio; means for determining whether the mobile device is to report a travel history corresponding to at least a portion of the period of time; means for generating a travel log for at least the portion of the period of time based, at least in part, on at least the first measurement and the second measurement; and means for transmitting one or more signals representing the travel log to an external device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
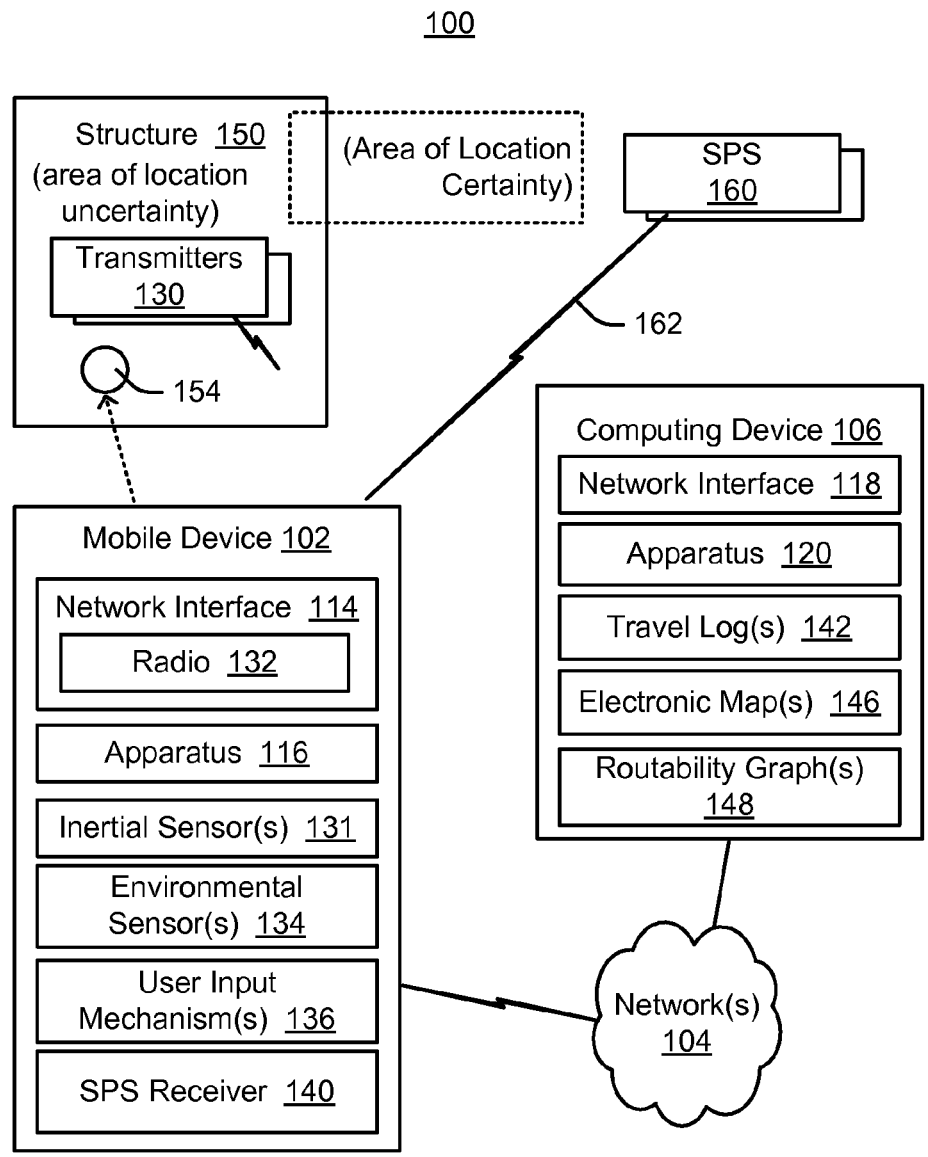
FIG. 1 is a schematic block diagram illustrating an example environment that includes a mobile device and a computing device for use in characterizing at least a portion of an area of location uncertainty within an indoor structure based on detected movements and/or position locations of the mobile device, in accordance with an implementation.

As described in greater detail herein, various methods, apparatuses and articles of manufacture are provided which may be implemented in various devices for use in characterizing at least a portion of an area of location uncertainty of an indoor structure based on detected movements and/or position locations of the mobile device.

As used herein, an "area of location uncertainty" is intended to specify at least one region in space for which wireless signaling location information may be sufficiently lacking (e.g., nonexistent, sparse, inaccurate, etc.) such that a mobile device may be unable to determine or otherwise estimate its location to a desired level of accuracy based, at least in part, on the wireless signals which may be received. Conversely, as used herein an "area of location certainty" is intended to specify at least one region in space for which wireless signaling location information may be sufficiently available to allow a mobile device to determine or otherwise estimate its location to a desired level of accuracy based, at least in part, on wireless signals which may be received. Thus, for example, in certain instances an electronic map and/or other like information (e.g., a radio signal heatmap, etc.) may include distinct areas that may be considered as either an area of location certainty or an area of location uncertainty based, at least in part, on the availability or unavailability, respectively, of adequate wireless signaling information with regard to the signaling environment within a given area.

By way of one particular example, an electronic map may specify a floor plan for a building comprising an older section and a newly constructed section. Since the older section of the building has been in place for some time, let us assume that sufficient wireless signaling location information is known and available to allow a mobile device to estimate its current location while in the older section of the building to a desired level of accuracy based, at least in part, on the wireless signals received therein. For example, a mobile device may have access to a radio signal heatmap, and/or the like, which may allow the mobile device to estimate its location within the older section of the building based on signals received from certain transmitting devices. Accordingly, an area within the older section of the building in this example may represent an "area of location certainty" with respect to the present description.

However, wireless signaling location information may be lacking with regard to all or part of the newly constructed section of the building. Thus, an area within the newly constructed section of the building in this example may represent an "area of location uncertainty" with respect to the present description since adequate wireless signaling location information is not available. Therefore, a user of a mobile device may, for example, travel through a portion of the newly constructed section of the building and end up somewhere in the older section of the building, which may represent a transition from an area of location uncertainty to an area of location certainty and at which point a position fix (of a desired level of accuracy) may be determined (e.g., using the wireless signaling location information available for the older section of the building). As described in greater detail herein, a mobile device may gather wireless signaling location information, other movement information, etc., while in an area of location uncertainty and possibly provide all or part of that information and/or information derived therefrom, e.g., as part of a travel log, etc., to one or more other devices along with the position fix. Thus, for example, separately or in addition to gathering wireless signaling location information, a mobile device may gather inertial and/or environmental sensor data from onboard sensors while in the newly constructed section of the building, and such gathered movement information may subsequently be used for dead reckoning or other like positioning purposes.

By way of another example, an electronic map may specify in outdoor area that is adjacent to a structure comprising an indoor area. Here, for example, all or part of an outdoor area may represent an "area of location certainty" with respect to the present description if wireless signals may be adequately received by a mobile device, e.g., from one or more SPS or other like location services, to allow the mobile device to determine or otherwise estimate its location to a desired level of accuracy based thereon. Accordingly, an area may be considered an area of location certainty if known wireless signals may be adequately received by a mobile device while in such an area to allow the mobile device to determine otherwise estimate its location to a desired level of accuracy based, at least in part, thereon. Assuming, that in this example, all or part of the structure may interfere with the mobile device acquiring such known wireless signals when the mobile device is within the structure, and further that there is an inadequate amount of wireless signaling location information available for an area with in the structure to allow the mobile device to estimate its location to a desired level of accuracy, then such an area within the structure may represent an "area of location uncertainty" with respect to the present description. However, a user of a mobile device may, for example, travel through a portion of such an indoor structure and end up somewhere outside, which may represent a transition from an area of location uncertainty to an area of location certainty since at or about that point in time a position fix may be determined within the area of location certainty. Again as described in greater detail herein, a mobile device may gather wireless signaling location information, other movement information, etc., while in such an area of location uncertainty and possibly provide all or part of that information and/or information derived therefrom, e.g., as part of a travel log, etc., to one or more other devices along with the position fix.

One or more measurements gathered over a period of time within an area of location uncertainty by a mobile device may be considered along with a subsequently obtained position fix (e.g., an estimated location of the mobile device within an area of location certainty) to detect movements and/or position locations of the mobile device within an indoor environment. For example, a position fix may be obtained based on SPS signals or other positioning system signals received by a mobile device upon transitioning to an area of location certainty, e.g., at some location position within or near to an indoor structure. For example, SPS signals may be received at or near an exit/entryway of an indoor structure, e.g., as a mobile device is moved out of an indoor structure. As illustrated in the examples herein, by gathering various sensor measurements prior to obtaining such a position fix, it may be possible to estimate a trajectory and/or path of travel of the mobile device in a period of time leading up to the position fix while the mobile device is within an area of location uncertainty. Moreover, in certain example implementations, various signaling characteristics may be gathered for an area of location uncertainty which may permit various signaling environment characteristic models and/or like radio heatmaps to be established, maintained, refined, and which may at some point in time allow for location position determination by mobile devices within an indoor structure (e.g., an area of location uncertainty may become an area of location certainty once an adequate amount of wireless signaling location information is available).

By way of example, certain measurements may be obtained with a mobile device and used to determine movements of the mobile device during a period of time, e.g., while the mobile device may be within an area of location uncertainty within an indoor structure and possibly leading up to a position fix. Such measurements may, for example, comprise sensor measurements from one or more inertial sensors in the mobile device, signal measurements from one or more wireless signals received by a radio in the mobile device, environment measurements from one or more environmental sensors in the mobile device, input measurements received from one or more user input mechanisms in the mobile device, and/or the like or some combination thereof, and which may be time-stamped or otherwise temporally relatable in some manner.

In certain example implementations, a mobile device may process all or part of the gathered measurements and/or the position fix in some manner to estimate its previous movements and/or location positions, and possibly to further characterize all or part of an indoor structure. In certain implementations, a mobile device may simply act to gather measurements and obtain a position fix and report such to an external device for further processing. In certain implementations, a mobile device may perform certain further processing on its own, e.g., using such gathered travel history.

In certain example implementations, a mobile device may determine whether all or part of its gathered travel history with regard to one or more areas of location uncertainty is to be reported, e.g., transmitted via one or more messages and/or encoded data files to one or more external computing devices. Such a determination may, for example, be based, at least in part, on a number and/or type of measurements obtained, a period time associated with the obtained measurements and/or a position fix, the particular indoor structure and/or other potential areas of location uncertainty, a received message, one or more flagged or otherwise identified values (flag value), one or more threshold values being satisfied, and/or the like or some combination thereof. In response to a determination that a travel history is to be reported, a mobile device may, for example, establish and transmit a travel log based, at least in part, on at least a portion of the gathered travel history (e.g., measurements from within an area of location uncertainty and position fix from within an area of location certainty).

In certain example implementations, a mobile device may perform additional processing to determine an estimated trajectory within an area of location uncertainty leading to a position fix within an area of location certainty based, at least in part, on the gathered travel history, e.g., using reversed dead reckoning and/or other like techniques. In certain example implementations, a mobile device may perform additional processing to estimate its path of travel with regard to an area of location uncertainty within an indoor structure based, at least in part, on an estimated trajectory, e.g., using an electronic map and/or a routability graph for the indoor structure, etc.

In certain example implementations, a mobile device may perform additional processing to characterize all or part of an environment at one or more points along its estimated trajectory within an area of location uncertainty, e.g., based, at least in part, on signal measurements/characteristics for wireless signals received from various transmitting devices. For example, a characterized environment may be indicative of at least a portion of a received signal heatmap, radio model, and/or the like for an indoor structure or portion thereof.

As such, a mobile device may, for example, establish and transmit a travel log for at least a portion of an area of location uncertainty that may comprise all or part of, and/or may be based at least in part on, a gathered travel history, one or more measurements, one or more position fixes from an area of location certainty, one or more estimated trajectories, one or more estimated paths of travel, one or more characterized environments, and/or the like or some combination thereof.

In certain example implementations, an external computing device may obtain one or more travel logs or portions thereof from one or more mobile devices for one or more areas of location uncertainty.

In certain example implementations, an external computing device may process at least a portion of the reported measurements and a position fix received from a mobile device in a travel log in some manner to detect the mobile device's movements and/or position locations, and/or to further characterize all or part of an area of location uncertainty with regard to it signaling environment. For example, an external computing device may determine an estimated trajectory of a mobile device within an area of location uncertainty leading to a position fix within an area of location certainty based, at least in part, on a received travel log, e.g., using reversed dead reckoning and/or other like techniques. For example, an external computing device may estimate a mobile device's path of travel with regard to an area of location uncertainty based, at least in part, on an estimated trajectory, e.g., using an electronic map and/or a routability graph for an applicable indoor structure, etc. For example, an external computing device may characterize an environment at one or more position locations along a mobile device's estimated trajectory and/or one or more position locations of an electronic map or the like, e.g., based, at least in part, on signal measurements for wireless signal received from transmitting devices by the mobile device while located within an area of location uncertainty. For example, a characterized environment may be indicative of at least a portion of a signal heatmap and/or the like for an indoor structure or portion thereof. In certain example implementations, an external computing device may establish/maintain a signal heatmap and/or the like for an indoor structure or portion thereof based on travel logs obtained from a plurality of mobile devices over time, e.g., as part of a crowd-sourcing server capability. Thus, for example, an indoor structure that may initially be considered an area of location uncertainty may subsequently be considered an area of location certainty.

In certain example implementations, an external computing device (e.g., as part of a crowd-sourcing server capability) may provide a suggested route of travel associated with an area of location uncertainty to a mobile device. Hence, a mobile device may, for example, indicate such a suggested route of travel to a user with regard to an indoor structure, which, if taken, may permit further measurements to be gathered along at least a portion of the suggested route of travel within an area of location uncertainty. As such, over time, an example crowd-sourcing server capability may establish/maintain various beneficial navigation data that may be of use by mobile devices in performing navigation and/or positioning functions relative to an indoor structure, etc.

As used herein the term "indoor structure" may, for example, apply to (all or part of) one or more natural and/or man-made physical arrangements of object(s), the knowledge of which may be of use to a user of mobile device. For example, an indoor structure may comprise all or part of a building that a user of a mobile device may enter into, exit from, and/or otherwise move about within. Some example indoor structures may comprise a mixture of indoor and outdoor spaces. In certain instances, an indoor structure may comprise one or more distinguishable regions. In certain instances, for example, two or more different regions within an indoor structure may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, stores in a shopping mall, etc. Unless otherwise stated, for the examples herein, it will be assumed that an indoor structure comprises one or more areas of location uncertainty, and conversely that and outdoor area or the like comprises at least one area of location certainty within which a mobile device may obtain a position fix of a desired accuracy.

Attention is now drawn to FIG. 1, which is a schematic block diagram illustrating an example environment 100 that includes a mobile device 102 and an external computing device 106.

As illustrated, mobile device 102 may be located at various positions 154 within an indoor structure 150. By way of example, mobile device 102 may comprise any electronic device that may be moved about by a user within a structure and which comprises a network interface 114. In this example implementation network interface 114 comprises a radio 132 for receiving signals transmitted by transmitters 130 (e.g., access point devices, cell towers, beacon transmitters, etc.) and/or possibly other resources in network(s) 104, etc. Thus, by way of some examples, mobile device 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile device 102 for use in characterizing indoor structure 150 based, at least in part, on detected movements and/or position locations of mobile device 102.

In certain example implementations, mobile device 102 may function exclusively or selectively as a stand-alone device, and may provide a one or more capabilities/services of interest/use to a user. In certain example implementations, mobile device 102 may communicate in some manner with one or more other devices, for example, as illustrated by the wireless communication link to the cloud labeled network(s) 104. Network(s) 104 may be representative of one or more communication and/or computing resources (e.g., devices and/or services) which mobile device 102 may communicate with or through, e.g., via network interface 114 using one or more wired or wireless communication links. Thus, in certain instances mobile device 102 may receive (or send) data and/or instructions via network(s) 104. In certain instances, mobile device 102 may, for example, not only receive a signal from a transmitter 130, but may also transmit a signal to such a transmitter (e.g., having a receiver).

In certain example implementations, mobile device 102 may be enabled to receive signals associated with one or more wireless communication networks, location services, and/or the like or any combination thereof which may be associated with one or more transmitters 130 and/or network(s) 104.

Mobile device 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile device 102 may be enabled (e.g., via an SPS receiver 140) for use with various SPS signals 162 from one or more transmitting devices of one or more SPS 160, such as, a Global Navigation Satellite System (GNSS), or other like satellite and/or terrestrial locating service, a location based service (e.g., via a cellular network, a WiFi network, etc.).

As further illustrated, in certain example implementations, mobile device 102 may be comprise one or more inertial sensors 131, such as, one or more accelerometers, one or more gyrometers/gyroscopes, and/or the like or some combination thereof. In certain example implementations, mobile device 102 may be comprise one or more environmental sensors 134, such as, one or more magnetometers and/or a compass, one or more barometers, one or more thermometers, one or more light transducers and/or cameras, one or more sound transducers and/or microphones, and/or the like or some combination thereof. In certain example implementations, mobile device 102 may be comprise one or more user input mechanisms 136, such as, one or more buttons, keys, and/or knobs, one or more touch screens, and/or the like or some combination thereof. In certain example instances, a user input mechanism 136 may comprise or use one or more environmental sensors, such as, a microphone and/or a camera to receive user inputs.

An example computing device 106 is illustrated as being connected to network(s) 104 via a network interface 118, which in certain implementations may be similar to network interface 114. Computing device 106 may, for example, comprise one or more computing platforms, e.g., servers, etc., which may provide an apparatus 120. Apparatus 128 is representative of circuitry, such as, e.g., hardware, firmware, a combination of hardware and software, and/or a combination of firmware and software or other like logic that may be provided in computing device 106 for use in characterizing indoor structure 150 based, at least in part, on detected movements and/or position locations of mobile device 102. Apparatus 120 may, for example, obtain (and/or maintain) one or more travel logs 142 from (and/or for) one or more mobile devices. Apparatus 120 may, for example, establish and/or maintain one or more electronic maps 146 for one or more indoor structures. Apparatus 120 may, for example, establish and/or maintain one or more routability graphs 148 for one or more indoor structures. Apparatus 120 may, for example, receive all or part of a travel log 142 from mobile device 102 via networks 104. Apparatus 120 may, for example, transmit all or part of electronic map 146 and/or all or part of routability graph 148 to mobile device 102 via networks 104. Apparatus 120 may, for example, transmit all or part of a signal heatmap and/or the like relating to an indoor structure to one or more mobile devices via network(s) 104.

Figure 2:
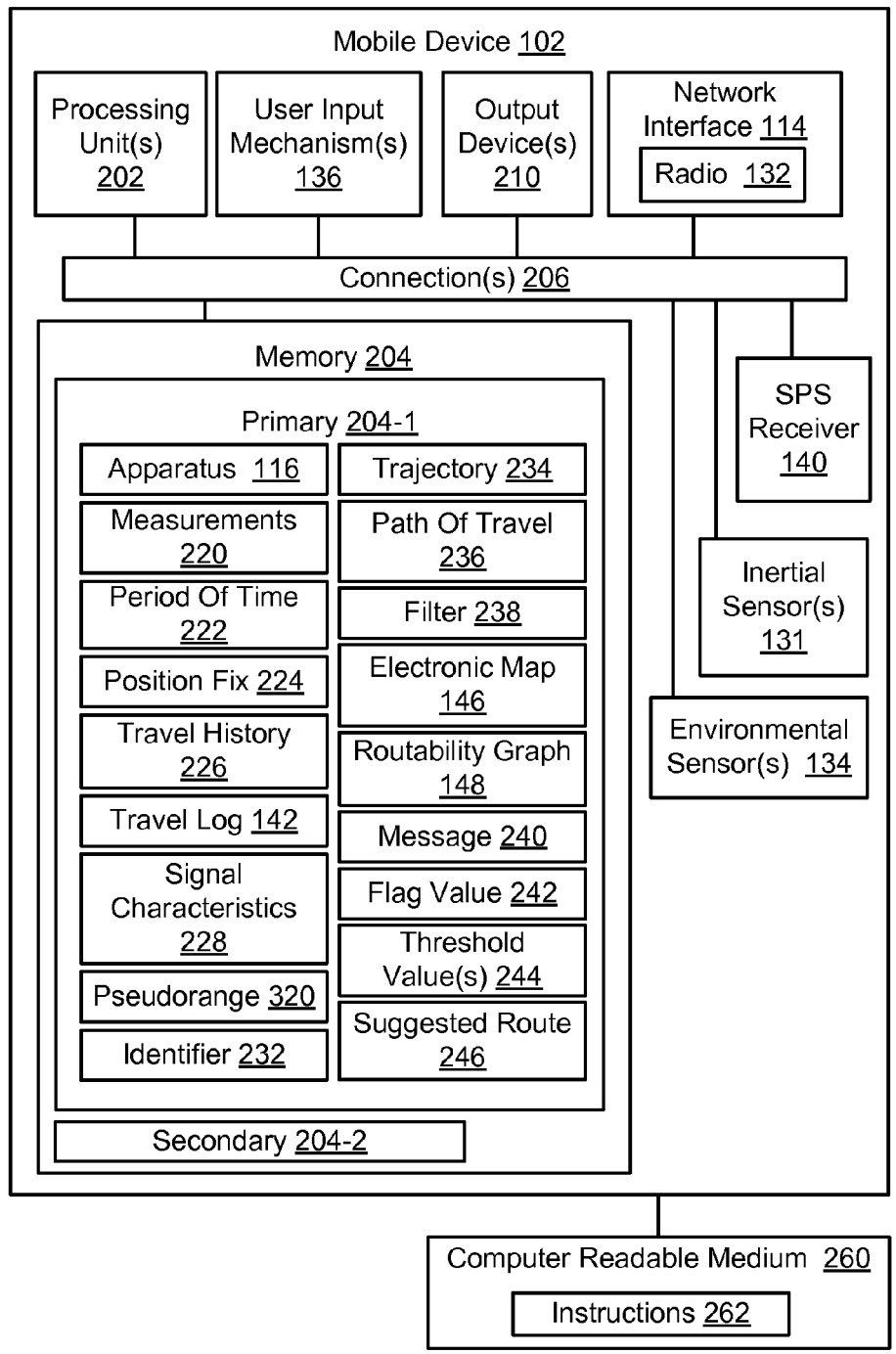
FIG. 2 is a schematic block diagram illustrating certain features of an example mobile device for use in characterizing at least a portion of an area of location uncertainty within an indoor structure based on detected movements and/or position locations of the mobile device, in accordance with an implementation.

FIG. 2 is a schematic block diagram illustrating certain features of an example mobile device 102 for use in characterizing an indoor structure (an area of location uncertainty) based on detected movements and/or position locations of the mobile device, in accordance with an implementation.

As illustrated mobile device 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 260. Memory 204 and/or computer readable medium 260 may comprise instructions 262 associated with data processing, e.g., in accordance with the techniques and/or apparatus 116 (FIG. 1), as provided herein.

Mobile device 102 may, for example, further comprise one or more user input mechanisms 136, one or more output devices 210, one or more network interfaces 114, one or more radios 132, one or more SPS receivers 140, one or more inertial sensors 131, and/or one or more environmental sensors 134.

User input mechanisms 136 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 130 and/or network(s) 104 (FIG. 1), e.g., via one or more wired and/or wireless communication links using radio 132. SPS receiver 216 may, for example, obtain signals from one or more SPS 160, which may be used in estimating a position fix that may be provided to or otherwise associated with one or more signals stored in memory. For example, SPS receiver 140 may be used to estimate a position fix that may indicate that mobile device 102 is at or nearby, or possibly approaching/leaving a particular exit/entryway of a structure.

Processing unit(s) 202 and/or instructions 262 may, for example, provide or otherwise be associated with one or more signals that may be stored in memory 204 from time to time, such as: instructions and/or encoded data relating to apparatus 116; a plurality of measurements 220 (e.g., time-stamped measurements, sensor measurements for inertial sensor(s), signal measurements for signal(s) received via a radio, environment measurements for environmental sensor(s), input measurements for user input mechanism(s), etc.); a period of time 222 (e.g., from a first measurement timestamp to a last measurement timestamp, from a first measurement timestamp to a position fix timestamp, etc.); a position fix 224 (e.g., a location coordinate, a map coordinate, etc.); a travel history 226; a travel log 142; signal characteristics 228 (e.g., for characterizing a signal environment, comprising or based, at least in part, on: received signal strength indication (RSSI) measurements, time of flight (TOF) measurements, round-trip-time (RTT) measurements, pseudoranges, etc.); one or more pseudoranges 320 (e.g., to a transmitting device, SPS, etc.); identifiers 232 of one or more transmitting devices (e.g., access point (AP) devices, etc.); one or more estimated trajectories 234 (e.g., distances, velocities, headings, elevations, travel modes, etc.); one or more paths of travel 236 (e.g., with regard to an electronic map, a routability graph, etc.); one or more filters 238 (e.g., a Kalman filter, a particle filter, etc., for use in estimating a trajectory and/or a path of travel, etc.); one or more electronic maps 146 (e.g., an encoded version of all or part of a floor plan, an architectural drawing, an engineering drawing, a CAD drawing, a personnel/entity location chart, etc.); one or more routability graphs 148 (e.g., encoded version of navigation route suitable for a user of a mobile device within a structure based, at least in part, on one or more electronic maps, etc.); one or more messages 240 (e.g., from an external computing device requesting that certain travel history be gathered/reported, etc.); one or more flag values (e.g., indicating whether to report travel history, etc.); one or more threshold values (e.g., for use in determining whether to report travel history, whether to establish a travel log, associated with a number of measurements, associated with a period time, associated with a type of at least one of the measurements, associated with a structure, etc.); and/or the like or some combination thereof.

Figure 3:
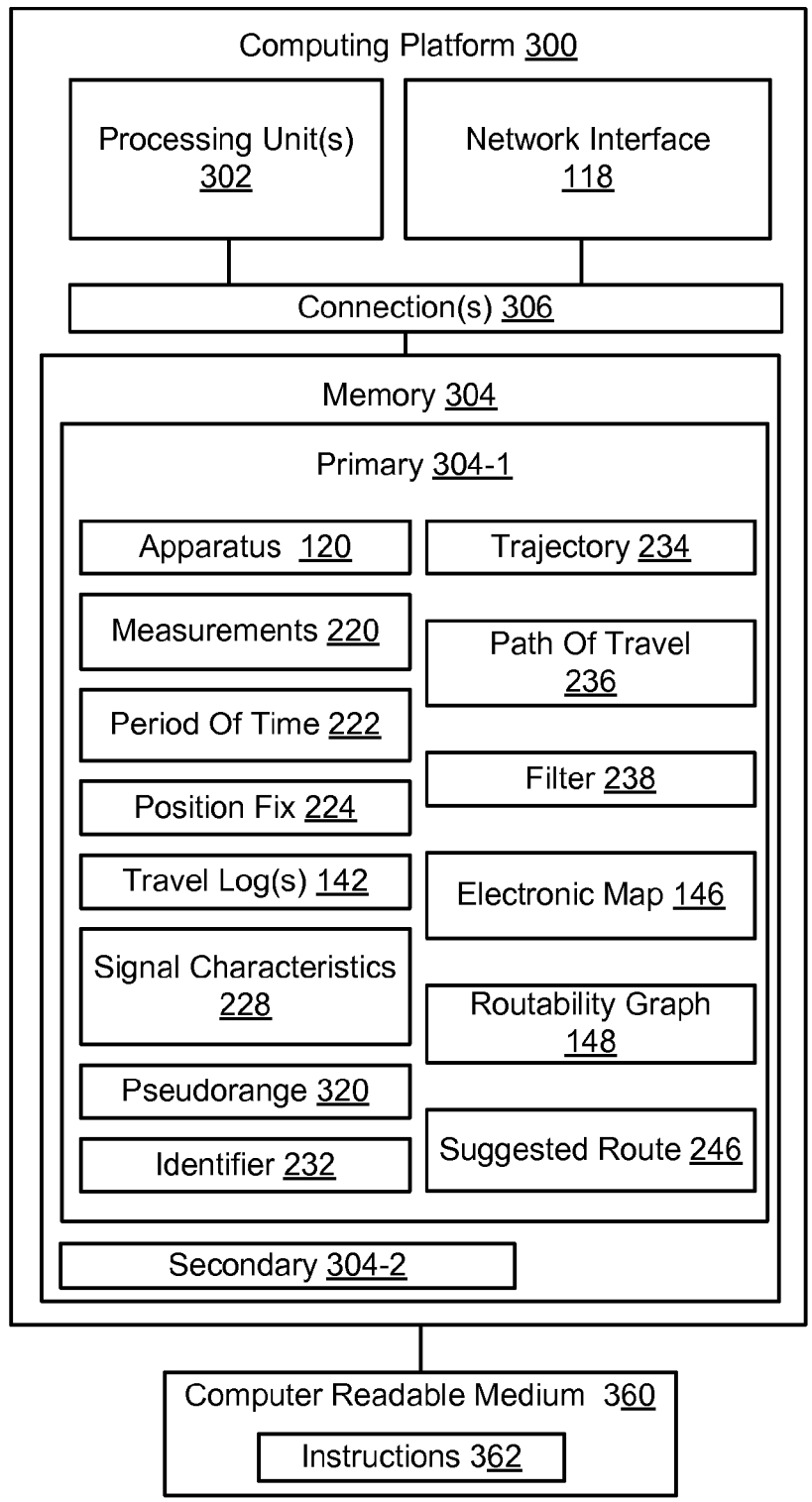
FIG. 3 is a schematic block diagram illustrating certain features of an example computing platform for use at a computing device to characterize at least a portion of an area of location uncertainty within an indoor structure based on detected movements and/or position locations of one or more mobile devices, in accordance with an implementation.

FIG. 3 is a schematic block diagram illustrating certain features of an example computing platform 300 for use at an external computing device 106 (FIG. 1) to characterize an indoor structure (an area of location uncertainty) he's based on detected movements and/or position locations of one or more mobile devices, in accordance with an implementation.

As illustrated computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within computing platform 300. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 360. Memory 304 and/or computer readable medium 360 may comprise instructions 362 associated with data processing, e.g., in accordance with the techniques and/or apparatus 120 or apparatus 126 (FIG. 1), as provided herein.

Computing platform 300 may, for example, further comprise one or more network interfaces 118. A network interface 118 may, for example, provide connectivity to network(s) 104, mobile device 102, and/or other devices (FIG. 1), e.g., via one or more wired and/or wireless communication links.

Processing unit(s) 302 and/or instructions 362 may, for example, provide or otherwise be associated with one or more signals that may be stored in memory 304 from time to time, such as: instructions and/or encoded data relating to apparatus 120; one or more sets of measurements 220; one or more periods of time 222; one or more position fixes 224; one or more travel logs 142; one or more signal characteristics 228; one or more pseudoranges 320; one or more identifiers 232; one or more estimated trajectories 234; one or more paths of travel 236; one or more filters 238; one or more electronic maps 146; one or more routability graphs 148; one or more suggested routes (e.g., with regard to an electronic map and/or routability graph, structure, signal characterizing heatmap, etc.); and/or the like or some combination thereof.

Figure 4:
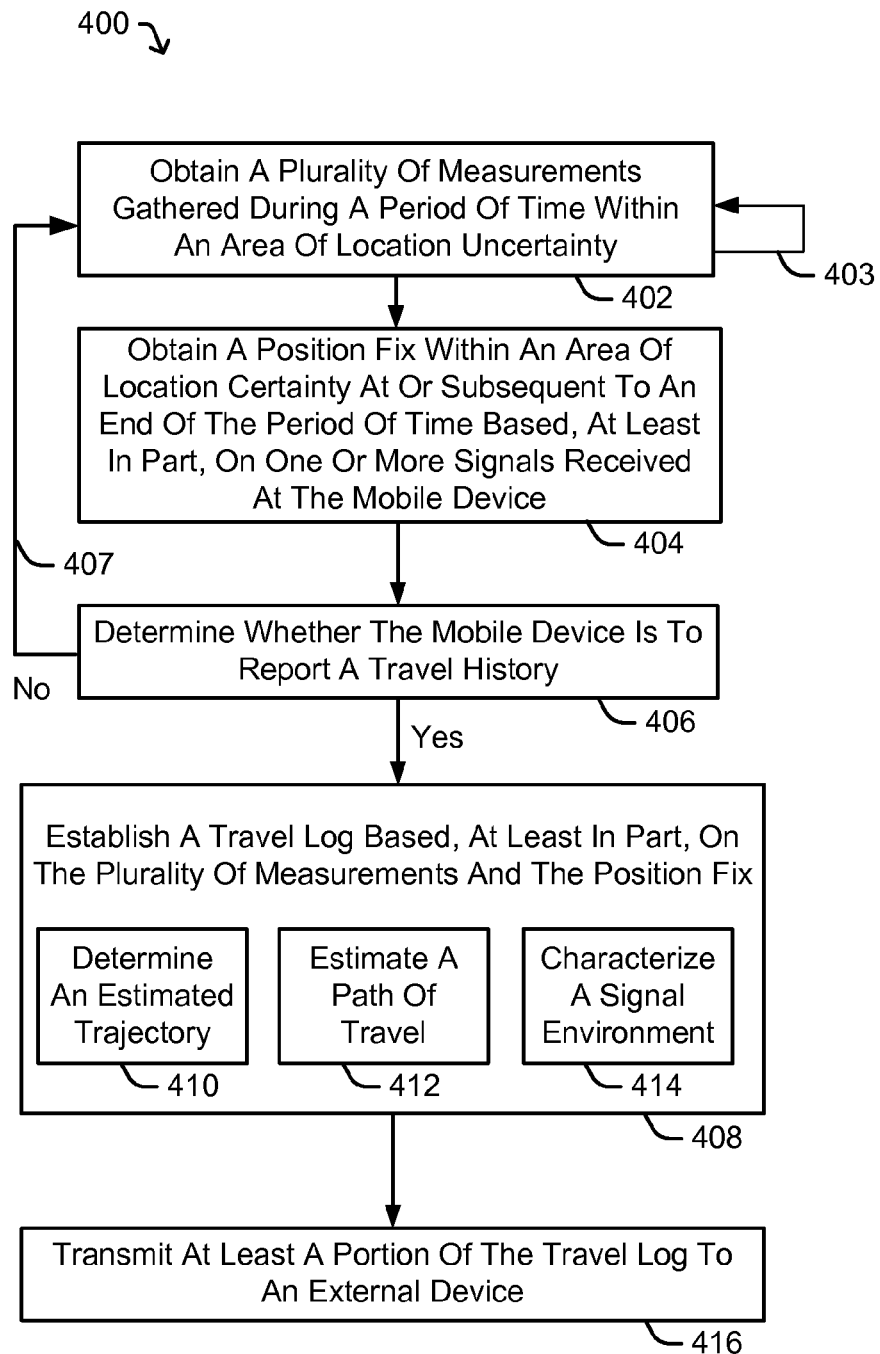
FIG. 4 is a flow diagram illustrating certain features of an example process or method for a mobile device for use in characterizing at least a portion of an area of location uncertainty within an indoor structure based on detected movements and/or position locations of the mobile device, in accordance with an implementation.

FIG. 4 is a flow diagram illustrating certain features of an example process or method 400 for use by a mobile device 102 for use in characterizing an indoor structure (an area of location uncertainty) based on detected movements and/or position locations of the mobile device, in accordance with an implementation.

At example block 402, a mobile device may obtain a plurality of measurements by gathering such measurements during a period of time within an area of location uncertainty. As illustrated by recursive arrow 403, in certain example implementations, block 402 may be repeated under certain conditions. For example, block 402 may be restarted or otherwise affected based on a threshold time value, a threshold movement value, a threshold power usage value, a memory limit value, and/or the like, e.g., such that a measurement gathering effort is not open ended, overly cumbersome, wasteful, inefficient, etc. For example, if a mobile device is stationary within a structure (e.g., a user is sitting in a chair), then block 402 may be capable of ending, restarting, timing out, waiting, being triggered, etc., at some point. For example, if a mobile device gathers more than or less than a threshold number of measurements, and/or a period of time is too long or short based on threshold values, then the resulting measurements may not be as useful or reliable as desired. Hence, a resulting travel history may be more useful if it relates to recent detectable movements, signals, inputs, times, etc., which may allow for a trajectory and/or path of travel within at least a portion of an area of location uncertainty to be estimated in a temporally reversed manner from a subsequent position fix within an area of location certainty. Thus, in certain examples, a position fix may indicate an end of a period of time at block 402. In other example implementations, a timestamp or some time thereafter of a last measurement obtained prior to a time of the position fix may represent an end of a period of time at block 402.

Furthermore, in certain example implementations, example block 404 may comprise determining whether the mobile device is within an area of location uncertainty based, at least in part, on an absence of sufficient wireless signaling location information to allow the mobile device to estimate its location to a desired level of accuracy, e.g., based, at least in part, on one or more wireless signals received at the mobile device. In certain in certain example implementations, at example block 404 may comprise determining whether the mobile device is within an area of location certainty based, at least in part, on a presence of sufficient wireless signaling location information to allow the mobile device to estimate its location to a desired level of accuracy, e.g., based, at least in part, on one or more wireless signals received at the mobile device.

In certain further example implementations, at example block 404 may comprise initiating the gathering of one or more measurements, e.g., based, at least in part, on at least one of: a passage of time; at least one signal generated by at least one sensor; and/or at least one user input.

At example block 404, a position fix may be obtained at, or subsequent to, an end of the period of time based, at least in part, on one or more signals received at the mobile device.

At example block 406 a mobile device may determine whether or not to report a travel history for one or more areas of location uncertainty. Thus, for example, one or more threshold values may be considered to determine whether or not to report a travel history. For example, at block 406, a number and/or type of measurements within an area of location uncertainty gathered at block 402 may be considered in determining whether or not to report a travel history. For example, at block 406, a length of the period of time during which measurements were gathered within an area of location uncertainty at block 402 may be considered in determining whether or not to report a travel history. For example, at block 406, one or more messages 240, flag values 242, an operating mode of the mobile device, and/or the like may be considered in determining whether or not to report a travel history. As illustrated by arrow 407, in response to a "No" determination at block 406 method 400 may, for example, return to block 402. In response to a "Yes" determination at block 406 method 400 may, for example, proceed to block 408.

At example block 408, a travel log may be established with respect to at least a portion of at least one area of location uncertainty to report a travel history based, at least in part, on the plurality of measurements and corresponding position fixes within one or more areas of location certainty. In certain example instances, a travel log may comprise an encoded version of all or part of the plurality of measurements and/or position fix. In certain example instances, a travel log may further or alternatively comprise one or more or some combination of: an estimated trajectory within an area of location uncertainty (e.g., as determined at block 410), an estimated path of travel within an area of location uncertainty (e.g., as determined at block 412), or a characterization of a signal environment within an area of location uncertainty (e.g., as determined at block 414).

At example block 416, at least a portion of a travel log established at block 408 may be transmitted to one or more external devices.

Figure 5:
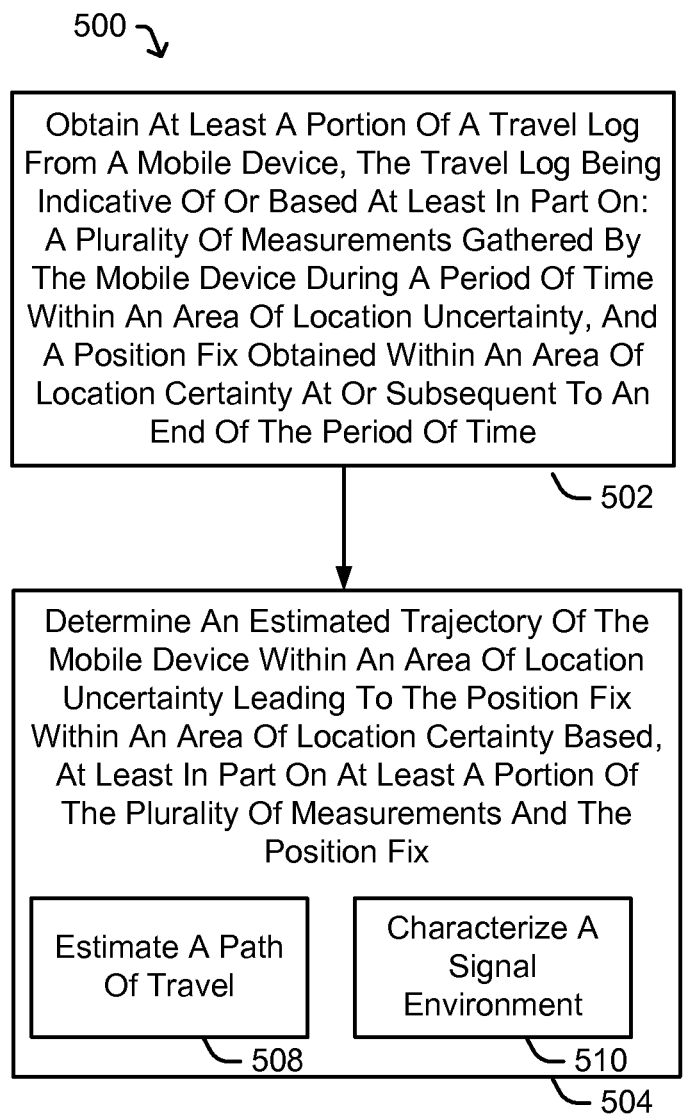
FIG. 5 is a flow diagram illustrating certain features of an example process or method for a computing platform for use at an external computing device to characterize at least a portion of an area of location uncertainty within an indoor structure based on detected movements and/or position locations of one or more mobile devices, in accordance with an implementation.

FIG. 5 is a flow diagram illustrating certain features of an example process or method 500 for a computing platform 300 for use at an external computing device 106 to characterize an indoor structure (an area of location uncertainty) based on detected movements and/or position locations of one or more mobile devices 102 therein, in accordance with an implementation.

At example block 502 at least a portion of a travel log may be obtained from a mobile device. For example, a travel log may be indicative of, or based at least in part on: a plurality of measurements gathered by the mobile device during a period of time within an area of location uncertainty, and a position fix within an area of location certainty obtained at, or subsequent to, an end of the period of time based, at least in part, on one or more signals received at the mobile device. In certain example implementations, a travel log may comprise an encoded version of all or part of the plurality of measurements and/or position fix. In certain example instances, a travel log may further or alternatively comprise one or more or some combination of: an estimated trajectory, an estimated path of travel, or a characterization of a signal environment, as determined by a mobile device with respect to an area of location uncertainty.

At block 504, an estimated trajectory of a mobile device within an indoor structure leading to the position fix may be determined (e.g., if needed) based, at least in part on at least a portion of the plurality of measurements and the position fix. In certain instances, for example, at block 506, an estimated path of travel may be determined, e.g., based on an estimated trajectory with regard to an electronic map, a routability graph, etc., for an indoor structure or portion thereof. In certain instances, for example, at block 508, a signal environment may be characterized, e.g., to establish/maintain a signal heatmap, etc., for an indoor structure or portion thereof. In certain example implementations, all or part of the determinations at block 504 may be based one or more travel logs from one or more mobile devices. In certain example implementations, at block 504 all or part of an estimated trajectory, estimated path of travel, signal environment characterization (e.g., signal heatmap, etc.), etc., may be transmitted to one or more other devices, including one or more mobile devices. Furthermore, in certain example implementations, at block 504, an electronic map, routability graph, etc., relating to an indoor structure may be affected in some manner based, at least in part, on the various measurements and/or determinations of methods 400 and/or 500.

As shown in the example methods 400 and 500 above, in certain implementations all or part of the trajectory estimation, path of travel estimation, and/or signal environment characterization determinations within an area of location uncertainty may be preformed at a mobile device 102, a computing device 106, and/or some combination thereof (e.g., in a distributed manner) and results shared accordingly.

Figure 6:
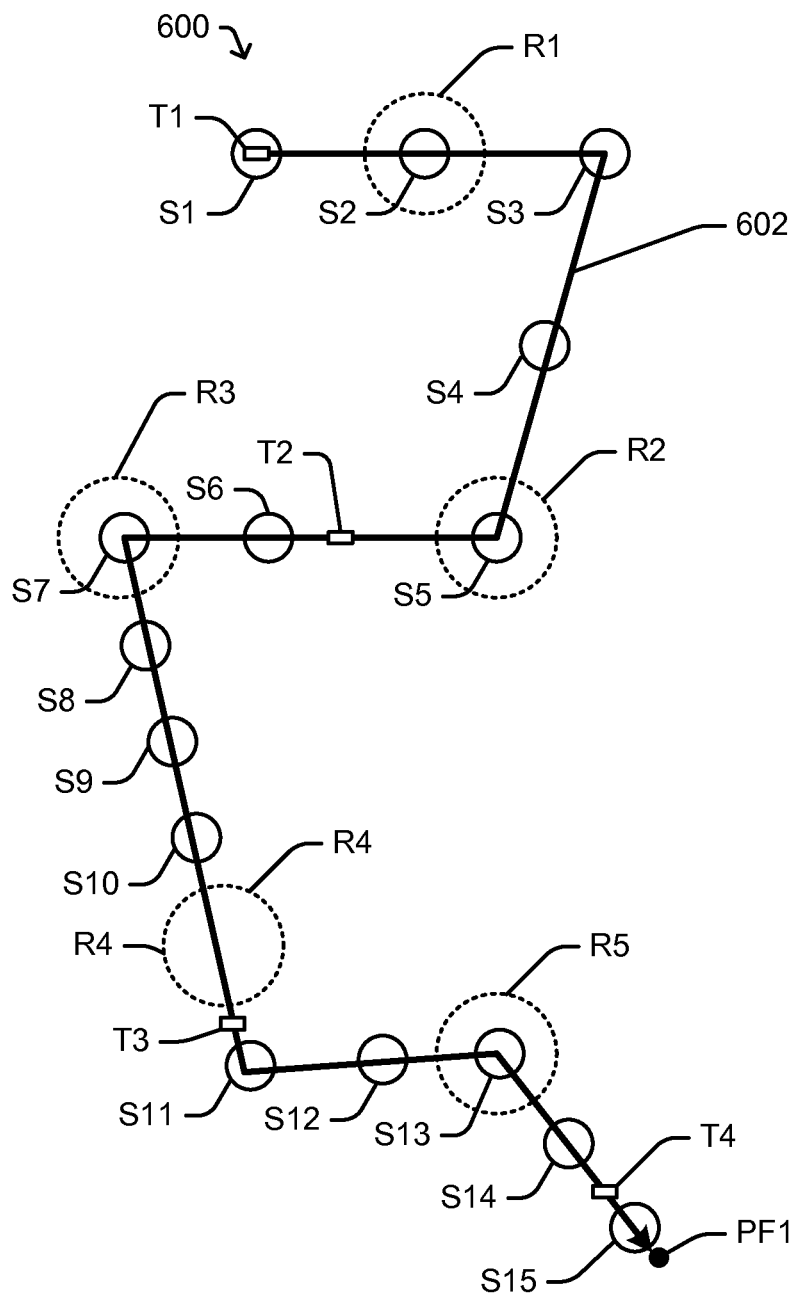
FIG. 6 is a diagram illustrating certain detected movements and/or position locations of a mobile device through at least a portion of an area of location uncertainty leading to a position fix obtained within an area of location certainty, in accordance with an implementation.

Attention is drawn next to FIG. 6, which is a diagram graphically illustrating certain detected movements and/or position locations 600 of a mobile device starting from a time T1 (within an area of location uncertainty) and leading to a position fix PF1 (within an area of location certainty) at or after a time T4, in accordance with an implementation. Thus, in this example, with regard to time, a period of time is illustrated at points along a trajectory 602 as beginning at time T1, continuing through times T2 and T3, and ending at either time T4 or at a time of position fix PF1.

As shown, there are several (sensor) measurements labeled S1 through S15 gathered as the mobile device is moved along trajectory 602 within an area of location uncertainty towards an area of location certainty. If the period of time ends at time T4, then in such an example, sensor measurements S1 through S14, but not S15 may be considered. If the period of time ends at a time of PF1, then in such an example, sensor measurements S1 through S15 may be considered. The sensor measurements represented by S1 through S15 may comprise or be based on various inertial sensor measurements, environmental sensor measurements, and/or user input measurements.

Additionally, as shown in FIG. 6, are several (radio signal) measurements labeled R1 through R5 gathered as the mobile device is moved along trajectory 602 within an area of location uncertainty towards an area of location certainty. In certain instances, a radio signal measurement may be gathered at or about the same time as a sensor measurement, e.g., see R1 and S2, R2 and S5, R3 and S7, and R5 and S13. In other instances, a radio signal measurement may be gathered at a different time, e.g., see R4 which is gathered between a time of S10 being obtained and time T3.

As mentioned, in certain example implementations, measurements may be time-stamped and hence trajectory 602, for example, recreated with detected movements from time T1 at S1 to PF1. For example, a filter may be used to estimate one or more trajectories based on measurements in reverse temporal order, e.g., from PF1 to S15 to S14 to S13 and/or R5, then to S12 and S11 and possibly R4 or S10, S9, S8, S7 and/or R3, and then to S6, S5 and/or R2, and then to S4 and S3, and possibly R1 or S2 and then S1.

Figure 7:
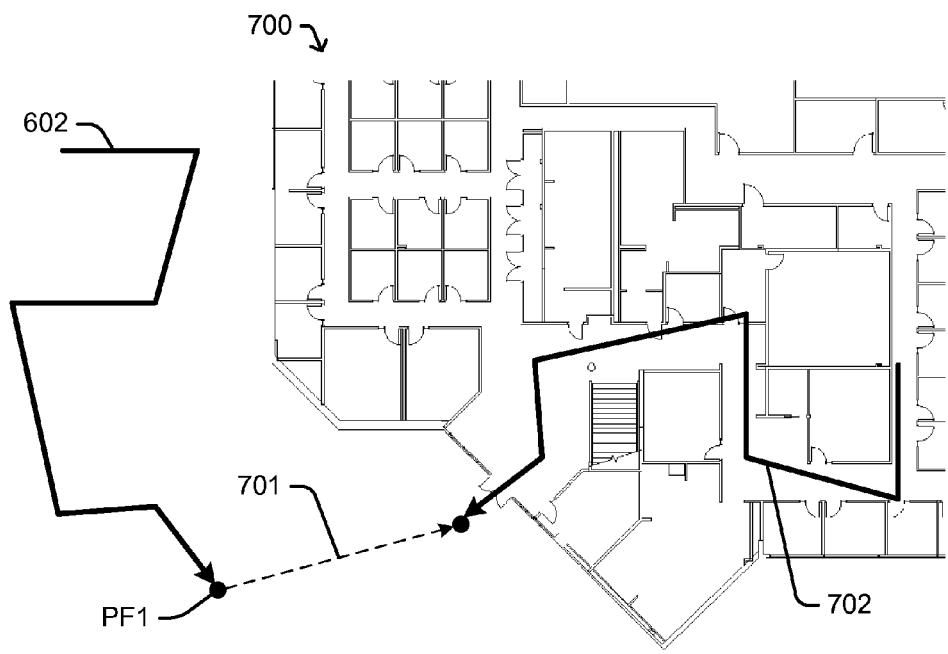
FIG. 7 is a diagram illustrating that certain detected movements and/or position locations of a mobile device through at least a portion of an area of location uncertainty leading to a position fix obtained within an area of location certainty as in FIG. 6 may be used to estimate a trajectory of movements within an area of location uncertainty an indoor structure, in accordance with an implementation.

Reference is made next to FIG. 7, which is a diagram illustrating that trajectory 602 may be related to a layout or floor plan 700 of a portion of a structure having a exit/entryway with a coordinates at or nearby that of PF1. As graphically shown, trajectory 602 when aligned to floor plan 700 using PF1 may be oriented as shown by trajectory 702 in a manner that appears to be a possible match to the areas of floor plan 700 which appear to be open for navigation by a user. For example, as may be seen in FIG. 7, trajectory 702 appears to indicate that a user with a mobile device moved though several connected hallways and exited the structure through an exit/entryway. Floor plan 700 may, for example, be considered in estimating a trajectory based on measurements.

Figure 8:
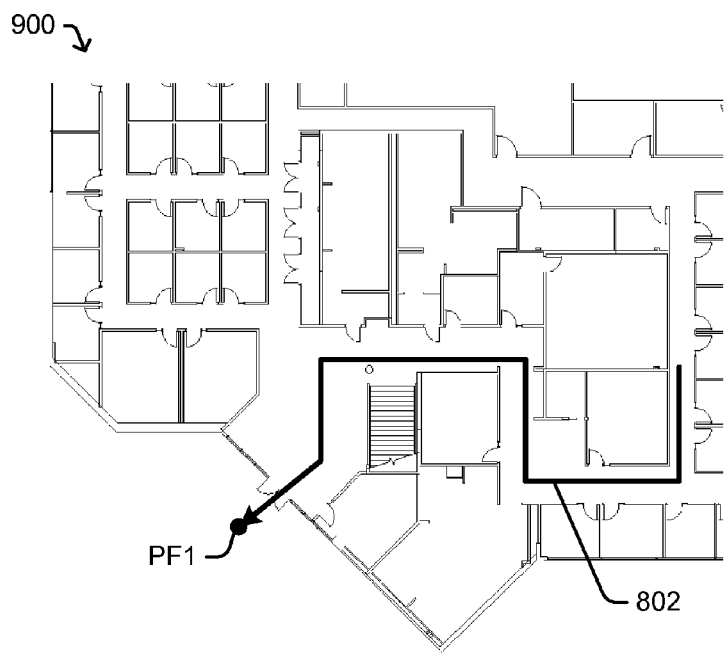
FIG. 8 is a diagram illustrating that certain trajectory of movements within at least a portion of an area of location uncertainty within an indoor structure as in FIG. 7 may be used to estimate a path of travel within an indoor structure, in accordance with an implementation.

With this in mind, as illustrated in a similar FIG. 8, a path of travel 802 may be determined based on trajectory 702 and applying constraints of an electronic map and/or routability graph. Hence, the resulting path of travel 802 may be used for future and/or other navigational and/or positional functions/purposes, and/or affecting an electronic map, a routability graph, a signal or radio heatmap, etc.

As illustrated in the examples above, in particular implementations, a location of a mobile device may be modeled as being placed at certain position locations (points) along edges connecting neighboring nodes in a routability graph. Likewise, transitions from an initial position to a subsequent position may be modeled to occur along edges of such a routability graph. In addition, a likelihood model may further characterize possible transitions of a mobile device from an initial position location to a subsequent position location over a time period. In a particular example, a particle filtering model and/or the like may establish a likelihood that a mobile device have a particular subsequent location, velocity and heading that is conditioned on an initial location, velocity and heading.

In certain example implementations, it may be possible to identify or estimate a particular travel mode based on certain measurements. For example, measurements may be compared to known signatures to identify or estimate that a mobile device is being transported in a particular manner. For example, it may be inferred that a user is walking or possibly running while carrying a mobile device based on inertial sensor measurements. For example, it may be inferred that a user is riding on an escalator or elevator, or some other machine while carrying a mobile device based on inertial sensor and/or environmental measurements. Thus, a travel mode may be used to estimate a trajectory and/or path of travel.

A particle filter and/or the like may, for example, incorporate measurements (e.g., R1-R5, or some subset thereof) obtained from signals received from wireless access point (APs) and/or the like while in an indoor structure. In updating and predicting a state of a mobile device, a particle filter may also incorporate measurements (e.g., S1-S14 or S1-S15, or some subset thereof) obtained from various sensors on the mobile device including sensors such as, for example, accelerometers, gyroscopes, magnetometers, cameras, microphones, buttons, just to provide a few examples. In a particular implementation, a particle filter may be used to estimate a past trajectory leading up to or preceding a position fix (e.g., PF1). For example, as illustrated herein, a mobile device may maintain a travel history of measurements obtained from RF receivers and/or various sensors by, for example, time-stamping and storing such measurements in a memory, and a travel log may be established. Subsequent to obtaining the stored measurements, a mobile device may obtain a position fix by, for example, obtaining a SPS signals upon exiting an indoor structure. In certain instances, a position fix may be obtained using other techniques such as indoor positioning techniques discussed above. Using the SPS position fix as a final and known location point in a trajectory, a particle filter may apply past time-stamped measurements to backtrack for tracing an estimated past trajectory leading up to the position fix, as illustrated herein.

An additional advantage of the techniques illustrated by the various non-limiting examples herein is that a signal heatmap and/or the like may be established/maintained over time using crowd sourcing.

Another advantage of the techniques illustrated by the various non-limiting examples herein is that processing may be offloaded from a mobile device to an external computing device.

Yet another advantage of the techniques illustrated by the various non-limiting examples herein is that one or more mobile devices may efficiently map an unknown and/or changing environment. For example, measurement gathering may be triggered in response to a mobile device entering an unmapped indoor structure and/or other like area of location uncertainty. For example, a mobile device may have a suggested route sent to it, which if taken may improve understanding of an indoor structure.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   in response to said mobile device accessing a radio signal heatmap to determine that said mobile device is entering or within an area of location uncertainty identified, at least in part, in said radio signal heatmap, gathering a plurality of measurements during a period of time, said plurality of measurements comprising at least a first measurement generated by one or more environmental sensors, and a second measurement generated by a radio based, at least in part, on one or more wireless signals received by said radio; and
   in response to a determination that said mobile device is to report a travel history corresponding to at least a portion of said period of time:
      generating a travel log for at least said portion of said period of time based, at least in part, on at least said first measurement and said second measurement; and
      transmitting one or more signals representing said travel log to an external device.

2. The method as recited in claim 1, wherein said one or more environmental sensors comprises a camera.

3. The method as recited in claim 2, wherein said first measurement comprises an image captured by said camera.

4. The method as recited in claim 1, wherein at least one of said plurality of measurements comprises a time-stamped measurement.

5. The method as recited in claim 1, wherein said plurality of measurements further comprises at least a third measurement generated by one or more inertial sensors, and said travel log is further based, at least in part, on said third measurement.

6. The method as recited in claim 1, wherein said second measurement is indicative of a radio signal measurement based, at least in part, on: a received signal strength indication (RSSI) measurement for at least one signal transmitted by another device, a time of flight (TOF) measurement for at least one signal transmitted from said another device to said mobile device, a round trip time (RTT) for at least one signal transmitted between said mobile device and said another device, a pseudorange from said mobile device to another device, or an identifier of another device, or combination thereof.

7. The method as recited in claim 1, and further comprising, at said mobile device:
   determining whether said mobile device is to report said travel history based, at least in part, on at least one of: a number of measurements in said plurality of measurements; said period of time associated with said plurality of measurements; a type of at least one of said plurality of measurements; an indoor structure; a position fix; a received message; a flag value; or a threshold value being satisfied.

8. The method as recited in claim 1, wherein said external device comprises a crowd-sourcing server capability supporting mobile device navigation.

9. A mobile device comprising:
   memory;
   a network interface comprising a radio;
   an environmental sensor; and
   a processing unit configured to:

access a radio signal heatmap to determine whether said mobile device is entering or within an area of location uncertainty identified, at least in part, in said radio signal heatmap;

in response to a determination that said mobile device is entering or within said area of location uncertainty, gather in said memory a plurality of measurements during a period of time, said plurality of measurements comprising at least a first measurement generated by said environmental sensor, and a second measurement generated by said radio based, at least in part, on one or more wireless signals received by said radio; and in response to a determination that said mobile device is to report a travel history corresponding to at least a portion of said period of time: generate a travel log for at least said portion of said period of time based, at least in part, on at least said first measurement and said second measurement; and initiate transmission of said travel log to an external device.

10. The mobile device as recited in claim 9, wherein said environmental sensor comprises a camera.

11. The mobile device as recited in claim 10, wherein said first measurement comprises an image captured by said camera.

12. The mobile device as recited in claim 9, wherein at least one of said plurality of measurements comprises a time-stamped measurement.

13. The mobile device as recited in claim 9, and further comprising:
an inertial sensor; and
wherein said plurality of measurements further comprises at least a third measurement generated by one or more inertial sensors, and said travel log is further based, at least in part, on said third measurement.

14. The mobile device as recited in claim 9, wherein said second measurement is indicative of a radio signal measurement based, at least in part, on: a received signal strength indication (RSSI) measurement for at least one signal transmitted by another device, a time of flight (TOF) measurement for at least one signal transmitted from another device to said mobile device, a round trip time (RTT) for at least one signal transmitted between said mobile device and another device, a pseudorange from said mobile device to another device, or an identifier of another device or combination thereof.

15. The mobile device as recited in claim 9, said processing unit further configured to:
determine whether said mobile device is to report said travel history based, at least in part, on at least one of: a number of measurements in said plurality of measurements; said period of time associated with said plurality of measurements; a type of at least one of said plurality of measurements; an indoor structure; a position fix; a received message; a flag value; or a threshold value being satisfied.

16. The mobile device as recited in claim 9, wherein said external device comprises a crowd-sourcing server capability supporting mobile device navigation.

17. An apparatus for use in a mobile device, the apparatus comprising:
means for gathering a plurality of measurements during a period of time, said plurality of measurements comprising at least a first measurement generated by one or more environmental sensors, and a second measurement generated by a radio based, at least in part, on one or more wireless signals received by said radio in response to said mobile device accessing a radio signal heatmap to determine that said mobile device is entering or within an area of location uncertainty identified, at least in part, in said radio signal heatmap;
means for determining whether said mobile device is to report a travel history corresponding to at least a portion of said period of time;
means for generating a travel log for at least said portion of said period of time based, at least in part, on at least said first measurement and said second measurement; and
means for transmitting one or more signals representing said travel log to an external device.

18. The apparatus as recited in claim 17, wherein said one or more environmental sensors comprises a camera and said first measurement comprises an image captured by said camera.

19. The apparatus as recited in claim 17, and wherein said plurality of measurements further comprises at least a third measurement generated by one or more inertial sensors, and said travel log is further based, at least in part, on said third measurement.

20. The apparatus as recited in claim 17, wherein said external device comprises a crowd-sourcing server capability supporting mobile device navigation.

* * * * *